United States Patent [19]

Kerr

[11] 4,333,673

[45] Jun. 8, 1982

[54] GATE LATCH

[75] Inventor: Kenneth G. Kerr, Timboon, Australia

[73] Assignees: Ada Margery Kerr; Alan Gordon Kerr; Keith Edward Kerr; Bruce Kenneth Kerr; Colin Frederick Kerr, all of Timboon, Australia

[21] Appl. No.: 137,017

[22] Filed: Apr. 4, 1980

Related U.S. Application Data

[63] Continuation-in-part of Ser. No. 936,727, Aug. 25, 1978, Pat. No. 4,226,450.

[30] Foreign Application Priority Data

Aug. 25, 1977 [AU] Australia .............................. PD1379
Oct. 21, 1977 [AU] Australia .............................. PD2149
Feb. 12, 1980 [AU] Australia .............................. PE2331

[51] Int. Cl.³ ................................................ E05C 5/02
[52] U.S. Cl. ...................................... 292/59; 292/216
[58] Field of Search ...................... 292/58, 59, 60, 61, 292/69, 78, 218, 213, 241, 216

[56] References Cited

U.S. PATENT DOCUMENTS

| 634,593 | 10/1899 | Sprague | 292/213 X |
| 997,335 | 7/1911 | Smith | 292/213 |
| 1,032,371 | 7/1912 | Beatty | 292/213 X |
| 1,194,786 | 8/1916 | Ross | 292/216 |
| 1,280,665 | 10/1918 | Clay | 292/216 |
| 1,469,800 | 10/1923 | McCleeary | 292/216 |
| 1,538,581 | 5/1925 | O'Connor | 292/241 |
| 1,786,247 | 12/1930 | Johnson | 292/241 |
| 2,136,408 | 11/1938 | Bedell | 292/241 X |
| 2,955,859 | 10/1960 | Krause et al. | 292/DIG. 14 |

FOREIGN PATENT DOCUMENTS 32674 10/1927 France ................................. 292/60

Primary Examiner—Richard E. Moore
Attorney, Agent, or Firm—Wigman & Cohen

[57] ABSTRACT

A gate latch comprises a tubular support and a latch member having a shaft portion mounted within the tubular support for rotation therein and a latch portion, extending axially outwardly from the shaft portion, having at least one peripheral projection extending axially outwardly from the shaft portion. Spacing defined by the at least one projection is such as to permit entry therein of a complemental gate locking bar extending from a complemental gate. The locking bar has a locking element at its free end to engage within the spacing defined by the at least one projection in order to lock the gate relative to the tubular support. A combination of the gate latch with the complemental gate locking bar and gate is also disclosed.

10 Claims, 7 Drawing Figures

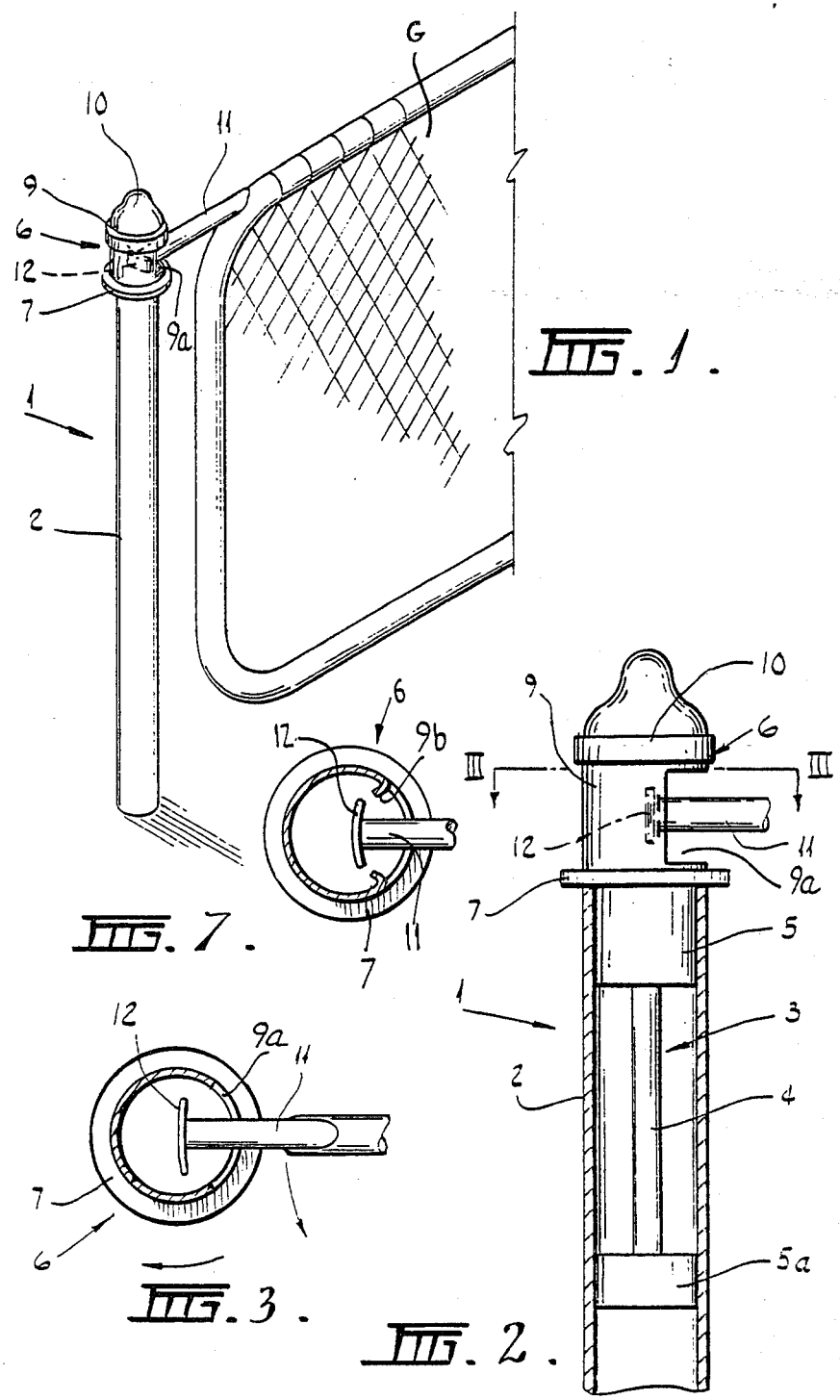

GATE LATCH

REFERENCE TO RELATED APPLICATION

This application is a continuation-in-part of U.S. application Ser. No. 936,727, filed Aug. 25, 1978, now U.S. Pat. No. 4,226,450, issued Oct. 7, 1980.

BACKGROUND OF THE INVENTION

This invention relates to gate latches.

OBJECTS AND SUMMARY OF THE INVENTION

The principal objective of this invention is to provide a gate latch which is self-locking upon the gate being closed and which can easily be opened by a simple manual operation.

According to the broadest aspect of the invention, a latch member is resiliently mounted within a tubular support and has a latch portion, associated therewith to cooperate with a complemental gate locking bar, in order to lock the latch member when said latch member is rotated to its extremity as a result of striking by the complemental gate locking bar.

Accordingly, the present invention provides a gate latch comprising a tubular support; a latch member having a shaft portion mounted within said tubular support for rotation therein and a latch portion, extending axially outwardly from said shaft portion, having at least one peripheral projection extending axially outwardly from said shaft portion; spacing defined by said at least one projection being such as to permit entry therein of a complemental gate locking bar extending from a complemental gate; said locking bar having locking means at its free end to engage within the spacing defined by said at least one projection in order to lock the gate relative to said tubular support.

Conveniently, the at least one projection may extend from a base member adapted to sit on said tubular support. Advantageously, the base member may have a single axially outwardly extending, cylindrical, tubular, wall-like projection, defining spacing therein in which there will be engagement by the gate locking bar in order to retain the same within the spacing defined by said at least one projection.

Preferably, the latch member may include a handle attached at a convenient location to enable manual rotation of the entire latch member relative to the tubular support in order to free the complemental gate locking bar from the latch portion of said latch member.

The latch member may also have a complemental abutment means on the tubular support in order to limit the relative rotation of the latch member.

The shaft portion of the latch member may advantageously have bearings or bearing-like means at each end thereof to enhance relative rotation of said latch member.

According to another aspect of the invention, there is provided a gate latch, as described hereinabove, including a complemental gate having a locking bar thereon, said locking bar having locking means associated therewith for engaging within the spacing defined by said at least one projection to cause retention by the at least one projection in order to lock the gate relative to the tubular support.

The locking means associated with said locking bar may conveniently take the form of an arcuate cap mounted on the outer end of the locking bar.

The invention also provides a modification of the gate latch disclosed hereinabove which renders the gate latch more secure, particularly more secure for small children.

Another object of the present invention is to provide an improved latch portion in a gate latch which is more economical to manufacture and more suitable for use in connection with small farm and domestic gates.

Accordingly, there is provided an improvement in a gate latch wherein a latch portion includes a single projection being a tubular wall extending axially outwardly from the shaft portion of the latch member, said tubular wall having an opening therein and being adapted to permit entry of a complemental gate locking bar. Preferably, the tubular wall is cylindrical.

In some instances, particularly where heavy usage is required of the gate latch such as in use on cattle farms, the tubular wall is preferably formed with inwardly turned lips at its extremities or edges forming the opening. The lip formations ensure that the complemental gate locking bar will be firmly retained within the spacing defined by the tubular wall when the gate is in the locking position.

The most important advantage of this configuration of the latch portion is that it is substantially more economical to manufacture than other configurations.

Thus, the latch member may be provided with at least one radially outwardly extending projection adapted to engage a complemental slot or recess in the opposed tubular support or other opposed tubular surface, said slot being shaped such that locking of the projection and, thus, of the latch member, occurs when the latch member is rotated to its extremity as a result of striking by the complemental gate locking bar.

As suggested above, the slot or recess may be located either in the tubular support itself or in a further inner tubular member located within the tubular support.

The resilient means may conveniently consist of a compression spring located beneath the latch member and advantageously retained within the further inner tubular member.

BRIEF DESCRIPTION OF THE DRAWINGS

The invention will now be described and illustrated with reference to a number of preferred embodiments shown in the accompanying drawings, wherein:

FIG. 1 is a perspective view, in part, which shows a gate latch according to this invention in working relation with a gate having a complemental gate locking bar thereon, the bar being in the captive position;

FIG. 2 is a partial cross-sectional view in elevation of the gate latch shown in FIG. 1 and also shows the complemental gate locking bar in its captive position;

FIG. 3 shows one embodiment of the tubular wall in a cross-sectional view along line III—III of FIG. 2;

FIG. 7 shows a second embodiment of the tubular wall, having inwardly turned lips, in a cross-sectional view along line III—III of FIG. 2.

DETAILED DESCRIPTION OF PREFERRED EMBODIMENTS

Figure 5:
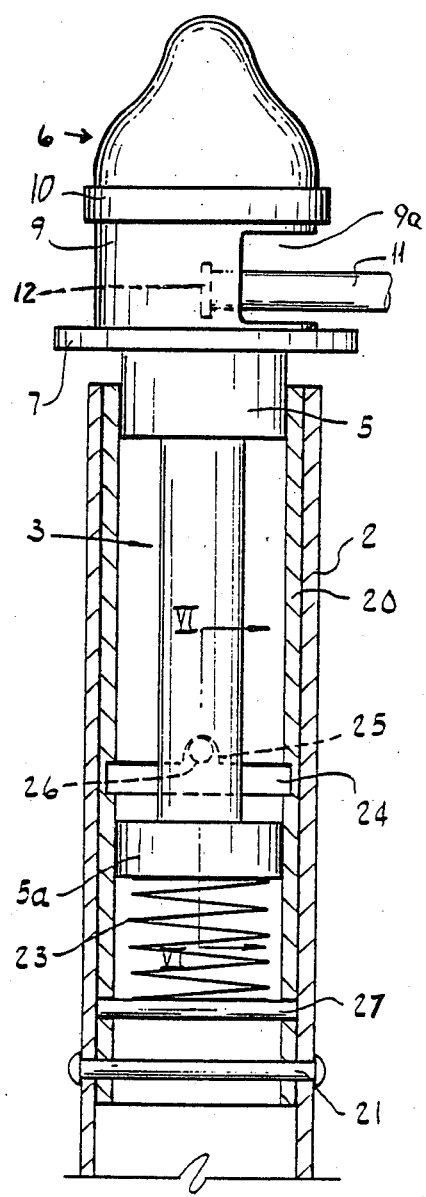
FIG. 5 shows yet a further embodiment of the gate latch of the invention.

Referring to FIGS. 1 to 3 of the drawings, a gate latch, generally indicated as 1, comprises a tubular support or hollow cylindrical gate post 2 which houses the shaft portion 4 of a latch member generally indicated as 3. The shaft portion 4 has two widened sections 5, 5a at each end thereof which act as bearings to facilitate rotation of the latch member 3 within the tubular support or gate post 2.

The latch member 3 has a latch portion, generally designated as 6, extending axially outwardly from said shaft portion 4 and consisting of a radially outwardly extending base plate 7, said plate 7 being adapted to sit on the top of the gate post 2 and having a single continuous tubular wall 9 projecting from the periphery of the plate 7 and terminating in a dome-shaped cap 10.

The latch portion 6, more particularly the cylindrically tubular wall 9, of the rotatable latch member 3 is adapted to cooperate with a complemental gate locking bar 11 attached to the top of a gate G upon closure thereof. The complemental gate locking bar 11 has a convexly curved hooking cap 12 at its free end adapted for engagement through an opening 9a in the tubular wall 9 to arrest angular movement of the complemental gate locking bar 11 and, hence, of the gate G. In FIG. 7, tubular wall 9 is shown as may be convenient in some uses, to have inwardly turned lips 9b at its extremities defining the opening 9a.

Figure 4:
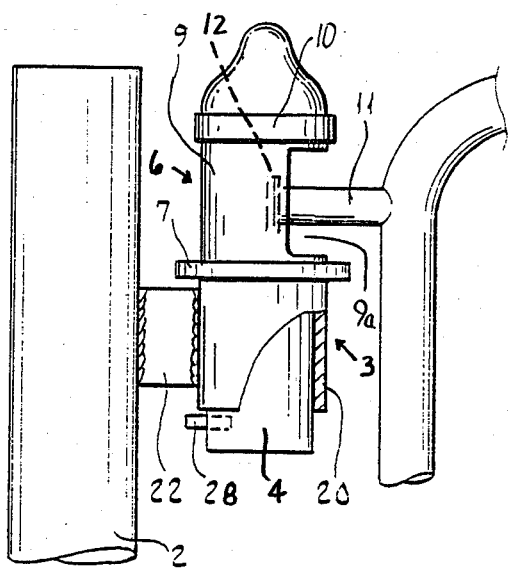
FIG. 4 shows another embodiment of the gate latch of this invention.

Referring to FIG. 4 which shows another embodiment in the drawings, a spacing plate 22 is located between fence post 2 and tubular support 20 (in the form of a bushing) and is attached thereto. Tubular support 20 houses the shaft portion 4 of the latch member 3 which has a constant cross-section (no widened portions 5, 5a) along its length and is conveniently of tubular configuration. The shaft portion 4 extends beyond the wall of the tubular support 20 and has a removable pin 28 located at its lower free end to prevent removal of the latch member 3 from tubular support 20.

In use, when the gate G is moved into the closed position, the complemental gate locking bar 11 strikes one side of the opening 9a in tubular wall 9 causing rotational movement thereof to a position where the arcuate movement of the gate locking bar 11 and the circular movement of the wall 9 intersect and at that point the arcuate movement of the locking bar 11 is arrested by virtue of the wall 9 engaging the convexly curved hooking cap 12 in spacing defined therein. It will be appreciated that the above mechanism results in an effective locking of the gate G relative to the gate post 2. Any unlocking of the gate G by reversing the angular movement of the gate G and gate locking bar 11 is impossible by virtue of the gate locking bar 11 being hooked onto the adjacent lips 9b or the edge of opening 9a when the wall 9 and the locking bar 11 move in the opposite direction and their lines of movement intersect.

Unlocking of the gate G is effected by manual rotation of the latch member 3 either by means of an optional handle or cap 10 mounted on said member 3 or by simply twisting the latch member 3 to a position where one of the operative lips 9b or edges of opening 9a contacts the gate locking bar 11 in which position of the latch member 3 the gate locking bar 11 can be angularly removed therefrom.

According to another embodiment (not shown) of the invention, the gate latch 1 may be used to cooperate with a slidable door or gate G in which case the locking bar 11 will extend laterally rather than longitudinally as shown in the drawings, from a side of the gate G or door so as to engage the wall 9 of the latch member 3 in a manner described hereinabove.

It will also be appreciated from the above that the present invention provides a very effective self-locking gate latch which gate latch 1 can be very effectively and simply unlocked by simple manual rotation of the latch member 3.

Figure 6:
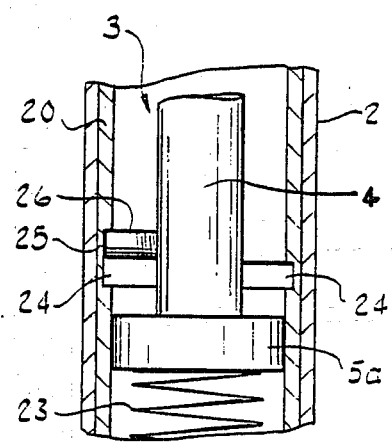
FIG. 6 is a sectional view along line VI—VI in FIG. 5.

Referring to FIGS. 5 and 6 which illustrate a third embodiment in the drawings, the tubular support 20 is rigidly mounted, advantageously by means of pin 21, within the gate post 2. Tubular support 20 supports a compression spring 23 by means of adjustable pin 27, the spring 23 in turn supporting the latch member 3.

Latch member 3 has at least one outwardly extending set screw 26 on its periphery.

The tubular support 20 has an elongated peripheral slot 24 with a lateral extension 25 adapted to accommodate the set screw 26 and to permit the screw 26 to move therewithin.

When the complemental gate locking bar 11 strikes the edge of the opening 9a in wall 9 of the latch member 3 and the latter reaches its angular extremity, the set screw 26, after moving within slot 24, moves into the lateral extension 25 of slot 24 with the aid of the compression spring 23, thus locking the latch member 3 relative to the tubular support 20.

The latch member 3 and, thus, the gate G are released by depressing and twisting the latch member 3 so that the set screw 26 is removed from the slot extension 25 and can be moved freely within the slot 24.

The foregoing preferred embodiments are considered as illustrative only. Numerous modifications will readily occur to those skilled in the pertinent art.

I claim:

1. A gate latch comprising:
    a tubular support;
    a latch member having a shaft portion, mounted within said tubular support for rotation therein, and also having a latch portion, extending axially outwardly from said shaft portion, said latch portion having at least one peripheral projection extending axially outwardly from said shaft portion; and
    a complemental gate locking bar extending from a gate and having locking means, at its free end, for engaging the latch portion within spacing defined by said at least one peripheral projection in order to lock the gate relative to said tubular support;
    wherein said at least one peripheral projection defines the spacing so as to permit entry of the complemental gate locking bar;
    said at least one peripheral projection is a tubular wall; and
    said tubular wall has an opening therein through which the complemental gate locking bar extends in order to lock the gate relative to the tubular support.

2. The gate latch, as defined in claim 1, further comprising:
    a handle means, attached to said latch member, for enabling manual rotation of the latch member relative to the tubular support in order to free the complemental gate locking bar from the latch portion.

3. The gate latch, as defined in claim 1, wherein:
said latch portion has a base member adapted to sit on said tubular support, said base member having the at least one peripheral projection axially outwardly extending therefrom.

4. The gate latch, as defined in claim 1, further comprising:
bearings or bearing-like means at each end of the shaft portion.

5. The gate latch, as defined in claim 1, wherein:
said latch member extends beyond the tubular support at its free end.

6. The gate latch, as defined in claim 1, wherein:
said latch member is mounted on a resilient member within the tubular support and has means, associated therewith, for cooperating with a complemental element on the tubular support;
whereby locking of the latch member occurs when said latch member is rotated to its extremity as a result of striking by the complemental gate locking bar.

7. The gate latch, as defined in claim 6, wherein:
said latch member is provided with at least one radially outwardly extending projection adapted to engage a complemental slot or recess in either the opposed tubular support or another opposed tubular surface, said slot or recess being shaped such that locking of the projection and, thus, of the latch member occurs when the latch member is rotated to its extremity as a result of striking by the complemental gate locking bar.

8. The gate latch, as defined in claim 6, wherein:
said resilient member includes a compression spring located beneath the latch member.

9. The gate latch, as defined in claim 1, wherein:
said tubular wall has inwardly turned lips at its edges forming the opening.

10. The gate latch, as defined in claim 1, further comprising:
abutment means, provided at a lower protruding end of the latch member, for preventing removal of the latch member from the tubular support.

* * * * *